United States Patent
Nakamura

(10) Patent No.: US 6,751,409 B2
(45) Date of Patent: Jun. 15, 2004

(54) EXTERIOR CASE OF ELECTRONIC APPLIANCE

(75) Inventor: Wataru Nakamura, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/446,943

(22) Filed: May 29, 2003

(65) Prior Publication Data
US 2003/0223184 A1 Dec. 4, 2003

(30) Foreign Application Priority Data

| May 31, 2002 | (JP) | ................................. | 2002-159052 |
| May 31, 2002 | (JP) | ................................. | 2002-159053 |
| Jun. 3, 2002 | (JP) | ................................. | 2002-161433 |
| Jun. 3, 2002 | (JP) | ................................. | 2002-161445 |

(51) Int. Cl.⁷ .............................................. G03B 17/02
(52) U.S. Cl. ............................. 396/25; 396/27; 396/29; 206/524.1
(58) Field of Search .............................. 396/25–29, 535; 206/524.1, 524.6

(56) References Cited

U.S. PATENT DOCUMENTS 5,871,097 A * 2/1999 Shida et al. ................. 206/521
6,567,614 B1 * 5/2003 Negishi et al. ................. 396/6

FOREIGN PATENT DOCUMENTS

JP          07-040960 A       2/1995

* cited by examiner

Primary Examiner—David M. Gray
(74) Attorney, Agent, or Firm—Sughrue Mion, PLLC

(57) ABSTRACT

The exterior case of an electronic appliance is integrally molded by two-color molding or insert molding with a hard resin and a soft resin. A front case part and a back case part of the exterior case is formed of the hard resin, and a connecting part between the front case part and the back case part is formed of the soft resin. The front case part and the back case part are assembled into a case-like shape by bending the connecting part.

13 Claims, 5 Drawing Sheets

EXTERIOR CASE OF ELECTRONIC APPLIANCE

BACKGROUND OF THE INVENTION

1. Field of the Invention

The present invention relates to an exterior case of an electronic appliance, in particular, to an exterior case of an electronic appliance which permits the cost reduction for an exterior case of an electronic appliance such as a digital camera and the like, and satisfactory protection of the electronic appliance.

2. Description of the Related Art

In general, an exterior case of an electronic appliance such as a digital camera is formed of a metal or a hard resin for the purpose of protecting the internal components of the appliance. In such an exterior case, a case body is composed of a front case portion and a back case portion, both of which are screwed to each other to encase the internal components. A grip of the exterior case is separately formed of a soft resin for the purpose of preventing slipping and improving the touch, and is attached onto the case main body.

When an electronic appliance such as a digital camera and the like is laid on a table, there is a fear that the electronic appliance will come down or fall off the table owing to vibration and the like. In order to protect electronic appliances from the adverse effects due to such happenings, some appliances are provided with the measures for vibration absorption. The measures for vibration absorption is effected by attaching members formed of a rubber or a soft resin onto the case body.

As for the above-described exterior case, it is necessary that parts are separately fabricated and the parts thus fabricated are assembled; this leads to the problem that the production cost is raised and additionally the assembling work becomes intricate. There is an additional problem that the measures for vibration absorption and slipping prevention further raise the production cost.

Incidentally, Japanese Patent Application Publication No. 7-40960 discloses a plastic container with a hinge for encasing food and the like wherein the main body and the lid are integrally molded into one piece through the intermediary of the hinge; however, there has been found no exterior case of an electronic appliance encasing the internal components thereof wherein the two divisions of the case are integrated into one piece through the hinge interposed therebetween.

SUMMARY OF THE INVENTION

An object of the present invention is the provision of an exterior case of an electronic appliance, wherein the production cost reduction can be brought into effect through reduction of the number of parts and reduction of the number of assembling steps.

Another object of the present invention is the provision of an exterior case of an electronic appliance, wherein both vibration absorption and slipping prevention can be achieved simultaneously.

Yet another object of the present invention is the provision of an exterior case of an electronic appliance, wherein the battery and the recording medium used in the electronic appliance are detachable.

An exterior case of an electronic appliance is required to have the strength, shape, and function for protecting the internal components of the electronic appliance, to be excellent in operational functionality, and to have excellent quality in design. Conventionally, an exterior case of an electronic appliance has usually been formed with separate parts which are fixed by using screws, by welding, by adhesive bonding, and by the like ways.

In the present invention, the separate parts, each formed of a hard resin or a soft resin according to the function of the part, are connectively assembled and molded into one piece. The resins may be distinguished by allotting different colors to the resins to effect the two-color molding. It is recommended that, according to the functions required for the respective parts, a hard resin is used for the parts required to have sufficient strength, and on the other hand a soft resin is used for the bending parts, operating parts, shock absorbing parts, slipping preventing parts, and the like. It is preferable that such movable parts as bending parts, operating parts, and the like are formed of a soft resin and are made thin partially. Such an integrally molded article as described above is molded by using a mold fabricated on the basis of the developed shape of a box-shaped case. After a case has been molded, the internal components are incorporated inside the case, and the bending part is bent inward to form a finished product.

In the instance of an exterior case of an electronic appliance where a battery and a recording medium are detachable, it is recommended that a receding part for housing the battery and a receding part for housing the recording medium are formed of a hard resin.

In order to attain the above-described objects, the present invention is directed to an exterior case of an electronic appliance, the exterior case comprising: a first case part and a second case part as two divisions of the exterior case, the first case part and the second case part being formed of a first resin; and a connecting part which connects the first case part and the second case part, at least a part of the connecting part being formed of a second resin softer than the first resin, wherein: the first case part, the second case part and the connecting part are integrally molded by one of a two-color molding and an insert molding with the first resin and the second resin; and the first case part and the second case part are assembled into a case-like shape by bending the part formed of the second resin in the connecting part.

According to the present invention, the exterior case is molded as a one-piece part by the two-color molding or insert molding with a hard resin (the first resin) and a soft resin (the second resin), wherein the hard resin ensures the strength for protecting the internal components of the electronic appliance, and the soft resin ensures the flexibility of the connecting part, thus assembling of the exterior case being made possible. The formation of the exterior case as a one-piece part makes it possible to reduce the number of parts, the cost allotted to the parts, and the number of assembling steps.

Preferably, the part formed of the second resin in the connecting part has a thin part to be bent.

The soft resin can be utilized not only for forming the connecting part, but also for forming the outside layer partially covering the portion made of the hard resin for the purpose of slipping prevention, design upgrading, or shock absorption. Furthermore, every corner or every face of the exterior case may be covered with parts formed of the soft resin so that the whole electronic appliance may be protected.

According to another embodiment of the present invention, a projection is made of the soft resin on the bottom face part of the exterior case, or the bottom face part is wholly covered with the soft resin, wherein the portion made of the soft resin is made to operate as a vibration absorbing member or as a slipping preventing member.

The formation of the soft resin projection in the bottom face part of the exterior case or the formation of the soft resin layer all over the bottom face part makes it possible to absorb the vibration affecting the electronic appliance and to prevent slipping when the electronic appliance is laid on a table or the like. Since the above-described hard resin portions and soft resin portions are formed by the two-color molding or the insert molding, the vibration absorbing member is not necessary to be formed in a special and separate process, and accordingly the operation for fixing the vibration absorbing member to the exterior case is unnecessary.

As a further other mode of utilization of the soft resin, an opening is formed in a part made of the first resin in the exterior case at a position corresponding to an operation button of the electronic appliance; and the opening is closed with the second resin to be a part of the operational button.

According to this mode, it becomes unnecessary to prepare a part (a key top or the like) of a button as an independent part.

According to yet another embodiment of the present invention, the electronic appliance is a digital camera having an optical member; and an opening is formed in a part made of the first resin in the exterior case at a position corresponding to the optical member of the digital camera, a border of the opening being covered with the second resin. Consequently, the optical member of the digital camera such as a taking lens and the like can be protected.

According to another embodiment of the present invention, a battery is detachably attached to the electronic appliance; and a receding part for housing the battery is integrally molded in at least one of the first case part and the second case part.

According to yet another embodiment of the present invention, a recording medium is detachably attached to the electronic appliance; and at least one of a receding part for housing the recording medium and an opening through which the recording medium is inserted and pulled out is integrally molded in at least one of the first case part and the second case part.

Herewith the receding part for housing the battery and/or the receding part for housing the recording medium is also integrally molded, so that the number of the parts in the electronic appliance can be further reduced.

As the hard resin, ABS resin, polycarbonate resin, and the like can be applied, and as the soft resin, an elastomer resin and the like can be applied.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Detailed description will hereunder be given of the preferred embodiments according to the present invention with reference to the accompanying drawings.

FIGS. 1 to 4 illustrate an embodiment wherein the exterior case of an electronic appliance according to the present invention is applied to an exterior case of a digital camera.

The exterior case 1 comprises a front case part 1a, a back case part 1b, and a bottom face part 2.

Figure 1:
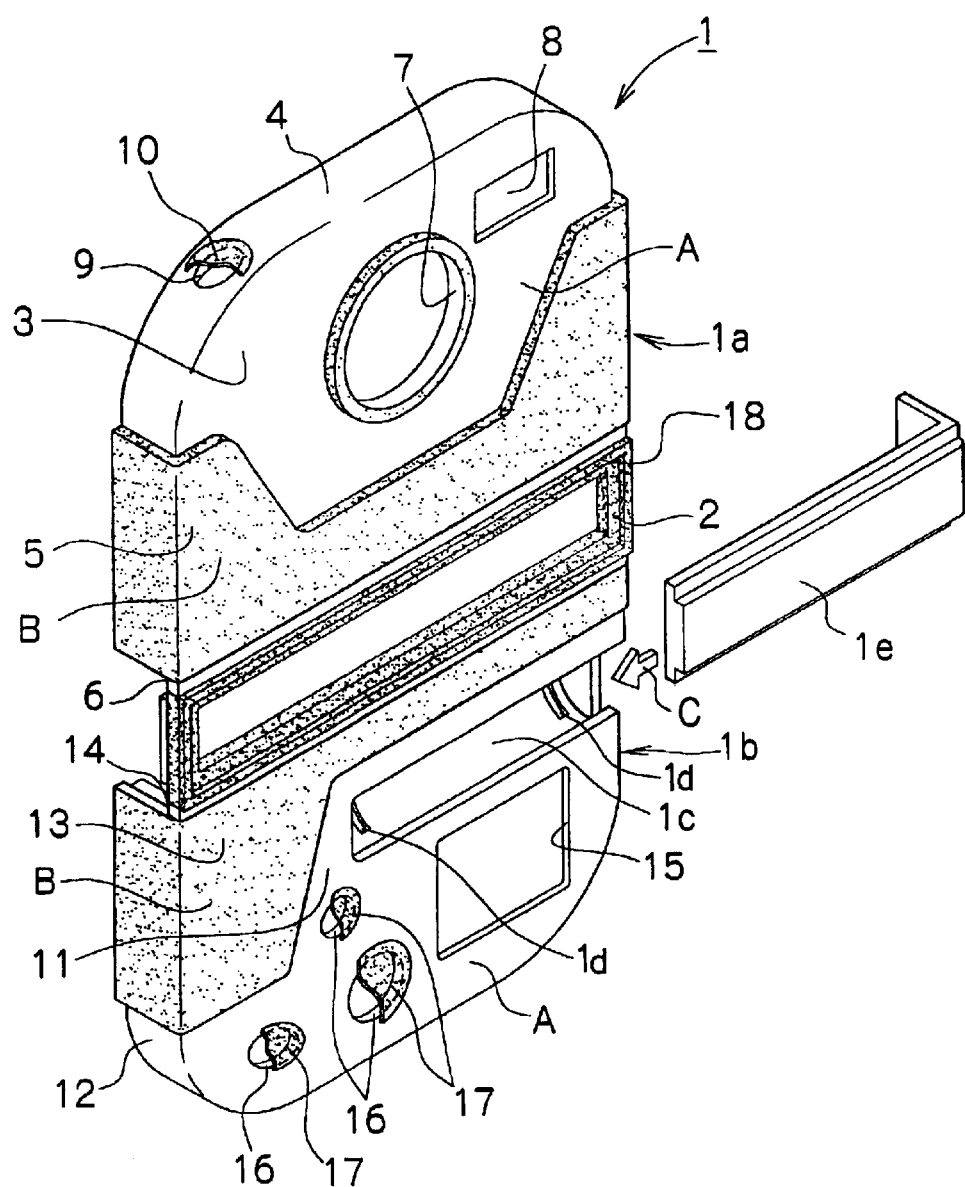
FIG. 1 is an oblique perspective developed view illustrating an exterior case to which is applied an exterior case of an electronic appliance involved in the present invention.
Figure 2:
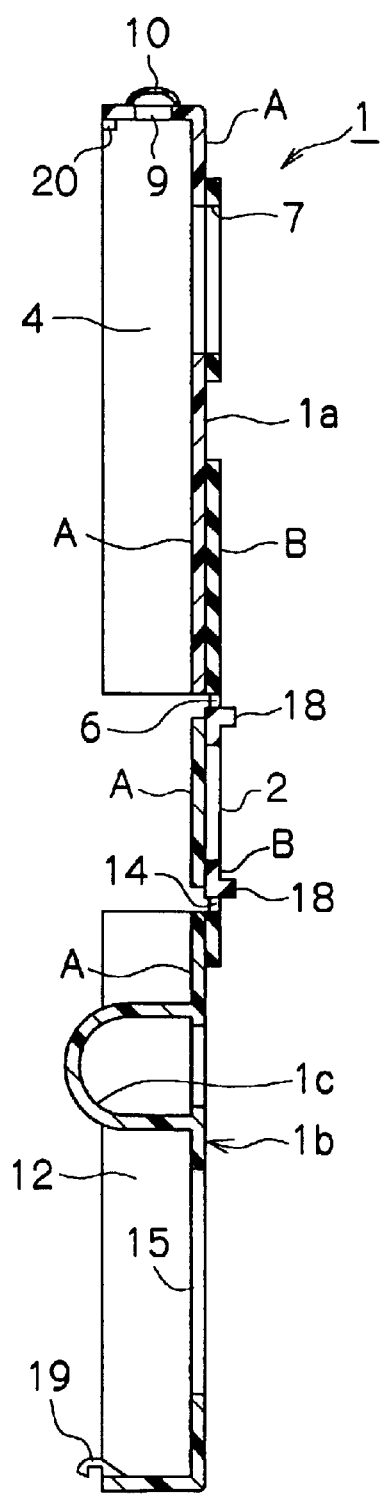
FIG. 2 is a sectional view of the exterior case shown in FIG. 1.
Figure 3:
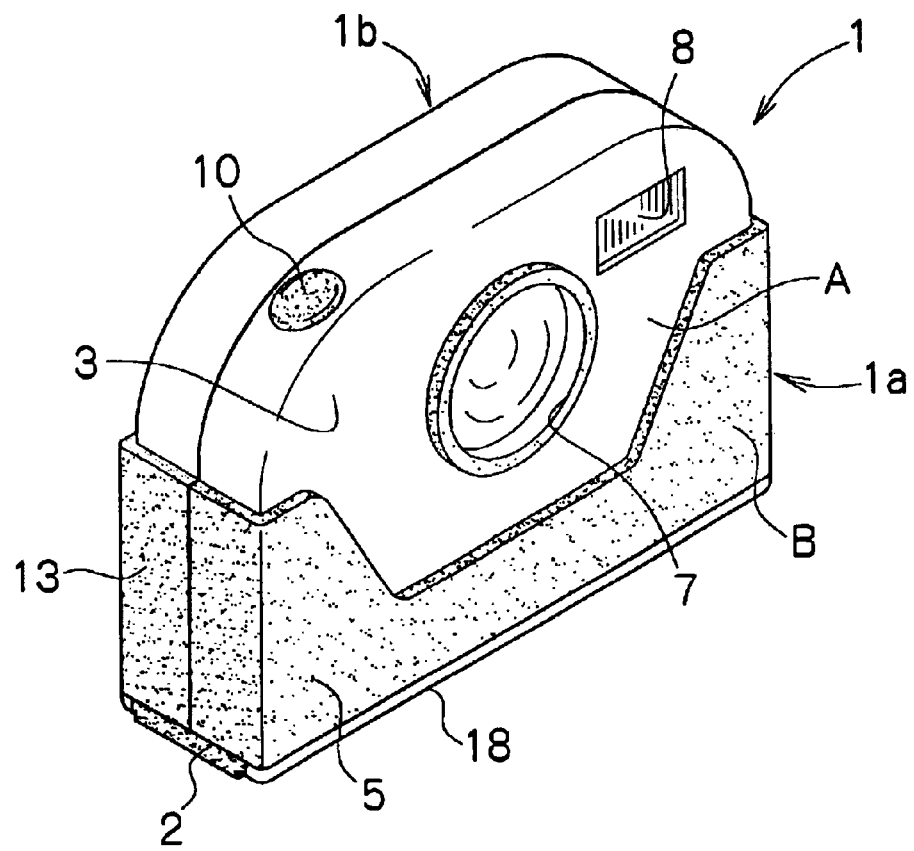
FIG. 3 is an oblique perspective view illustrating the assembled condition of the exterior case for which the developed view is shown in FIG. 1.

The front case part 1a is formed with a front face wall 3, and a side face wall 4 arranged so as to make a right angle with the front face wall 3 and to surround the front face wall 3. Most part of the front case part 1a is formed of a hard resin A (e.g., ABS resin, polycarbonate resin, etc.). In a lower part of the front case part 1a, an area (shaded area in FIG. 1) made of a soft resin B (e.g., elastomer resin), which forms a slipping preventing part 5, is integrally formed over the outside surface of the part made of the hard resin A in a manner of integral molding by two-color molding or insert molding. The slipping preventing part 5 partially constitutes a part through which the exterior case 1 is grasped by a user. As shown in FIG. 2, a thin part 6 is formed, as a bending part, along the lower hem of the soft resin B part forming the lower part.

In an upper part of the front face wall 3, there are formed an opening 7 for arranging a lens, a window 8 for equipping an electric flash, and the like. Among them, a member made of the soft resin B is integrally molded along the border of the opening 7 for the purpose of improving the quality of design or protecting the lens. Furthermore, an opening 9 for a shutter-release button is formed on the upper part of the side wall face 4, and the opening 9 is closed with the soft resin B to form a key top 10 for the shutter-release button.

On the other hand, the back case part 1b is formed with a back face wall 11, and a side face wall 12 arranged so as to make a right angle with the back face wall 11 and to surround the back face wall 11. As shown in FIGS. 1 and 2, a receding part (hereinafter referred to as a battery recess) 1c for housing a size AA battery or a size AAA battery is integrally molded in the back case part 1b. The battery recess 1c has openings 1d for arranging battery contacts (not shown). A battery lid 1e closes the battery recess 1c by being moved along the direction of the arrow C. The battery lid 1e is molded separately from the back case part 1b.

In the present embodiment, the battery recess 1c is integrally molded in the back case part 1b; however, a battery recess may be integrally molded either in the front case part 1a or in the bottom face part 2. The battery recess can be molded in a desired shape in such a way that the battery recess can house a secondary battery for exclusive use in the appliance concerned, the battery to be used being not limited to a size AA or AAA battery.

Most part of the back case part 1b is formed of the hard resin A. In a lower part of the back case part 1b, an area made of the soft resin B (shaded area), which forms a slipping preventing part 13, is integrally formed over the outside surface of the part made of the hard resin A. The slipping preventing part 13 partially constitutes the part through which the exterior case 1 is grasped. As shown in FIG. 2, a thin part 14 is formed, as a bending part, along the lower hem of the soft resin B part forming the lower part.

In an upper part of the back face wall 11, there is formed an opening 15 for arranging a liquid crystal monitor. Furthermore, in the upper part of the back face wall 11, there is formed an opening 16 for a menu/execution button, and the opening 16 is closed with the soft resin B to form a key top 17 for the menu/execution button.

Furthermore, in the bottom face part 2, most of the bottom face is formed of the hard resin A, and a layer composed of the soft resin B is formed outside the face made of the hard resin A in such a way that the soft resin B layer covers the face made of the hard resin A. A rib 18 is formed along the periphery of the bottom face part 2 formed of the soft resin B. The rib 18 exhibits the effects of slipping prevention and vibration absorption when the case 1 is laid on a table and the like.

Claws 19 and 20 are integrally molded respectively in the side wall 4 in the upper part of the front case part 1a and in the side wall 12 in the upper part of the back case part 1b.

The exterior case 1 is integrally formed by the two-color molding or insert molding with the hard resin A and the soft resin B, and furthermore the key tops 10 and 17 of the operation buttons and the like are integrally molded with the soft resin B.

Figure 4:
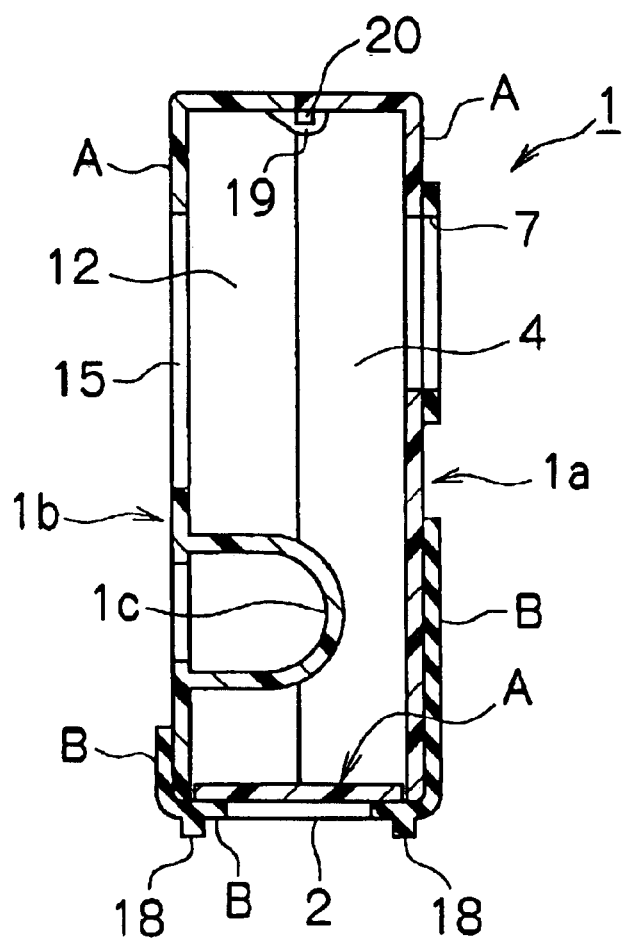
FIG. 4 is a sectional view of the exterior case shown in FIG. 3.

Both case parts 1a and 1b are associated with each other by bending the thin parts 6 and 14 so that the internal components (not shown) are housed between the front case part 1a and the back case part 1b, and the claws 19 and 20 of the case parts are made to engage with each other to assemble the exterior case 1 as shown in FIG. 4.

In the above-described embodiment, the rib 18 is formed of the soft resin B along the periphery of the outside face of the bottom face part 2; however, the bottom face part 2 may be wholly covered with the soft resin B.

The soft resin B may be used for formation of the parts (for example, the corners of the case) of the electronic appliance that get into touch with external matters, or may be used for covering every face of the exterior case. Herewith, the electronic appliance is wholly protected by use of the soft resin B.

Furthermore, in the above-described embodiment, the thin parts 6 and 14 are formed by making grooves inside the bottom face part 2; however, the grooves may be formed outside the bottom face part 2.

Figure 5:
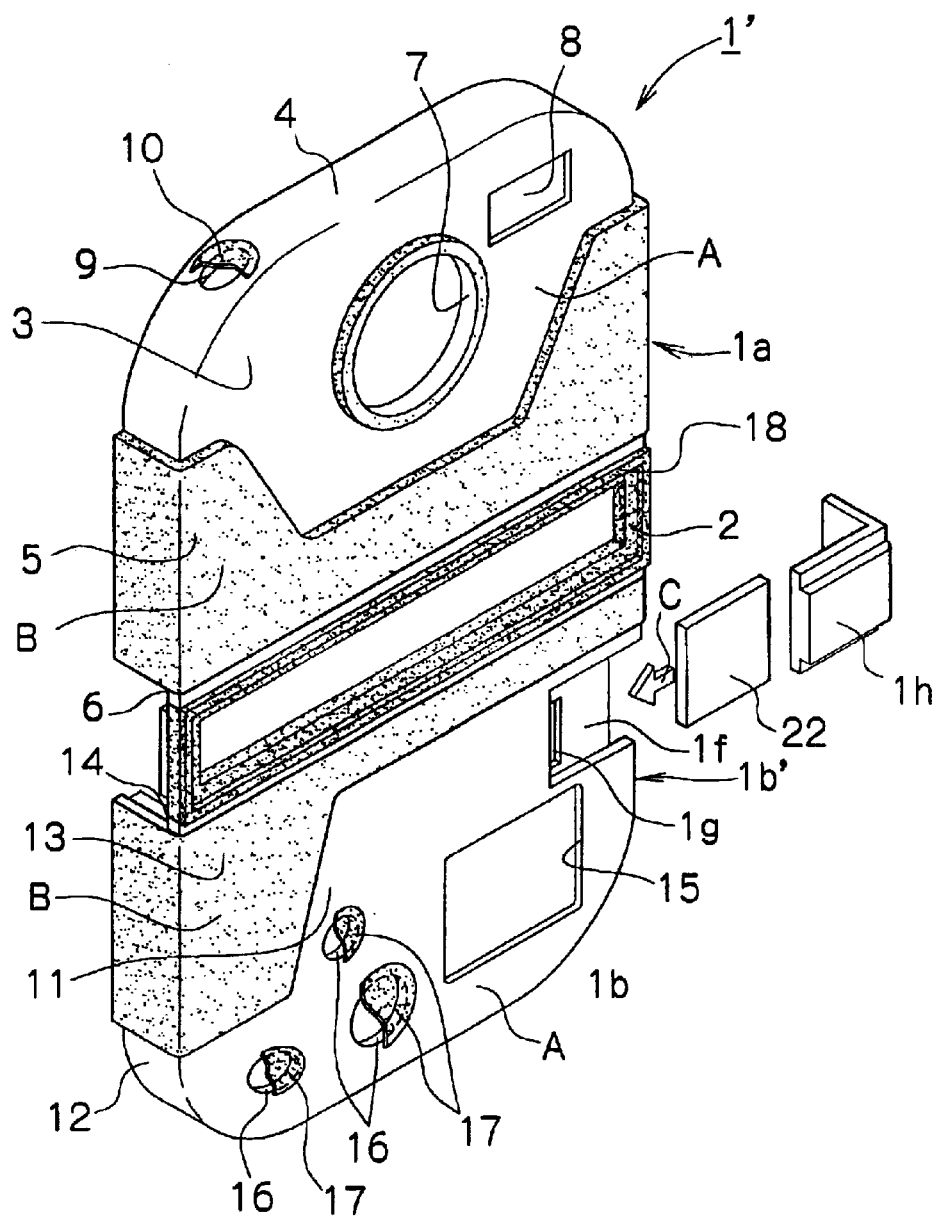
FIG. 5 is an oblique perspective developed view illustrating an exterior case of a digital camera showing another embodiment.

FIG. 5 is a developed perspective view illustrating an exterior case of a digital camera showing another embodiment of the present invention. The same symbols as those in FIG. 1 are used for the parts common to those in FIG. 1, and detailed description of the parts is omitted.

A comparison of the exterior case 1 shown in FIG. 1 and the exterior case 1' shown in FIG. 5 shows that the exterior cases 1 and 1' are different from each other in that the battery recess 1c is integrally molded in the back case part 1b shown in FIG. 1, but a receding part (hereinafter referred to as a medium recess) 1f for housing a recording medium 22 is integrally molded in a back case part 1b' shown in FIG. 5.

The medium recess 1f has an opening 1g for arranging a connector (not shown) for the recording medium 22. The recording medium 22 is housed in the medium recess 1f by being moved along the direction of the arrow C in FIG. 5. A medium lid 1h closes the medium recess 1f by being moved along the direction of the arrow C. The medium lid 1h is molded separately from the back case part 1b'.

In the present embodiment, the medium recess 1f is integrally molded in the back case part 1b'; however, a medium recess may be integrally molded either in the front case part 1a or in the bottom face part 2. Alternatively, only an opening through which the recording medium 20 is inserted and pulled out may be formed in the front case part 1a, the back case part 1b' or the bottom face part 2.

In the above-described embodiments, there is shown an example wherein the present invention is applied to an exterior case of a digital camera, but the present invention can be applied not only to the exterior case of a digital camera but also to the exterior cases of other electronic appliances such as a CD player, a mobile phone, and the like.

As described above, according to the present invention, an exterior case can be integrally molded into a developed shape, so that the exterior case can be formed as a one-piece part, the number of the parts and the number of the assembling steps can be reduced, and the production cost reduction can be brought into effect.

The two-color molding or the insert molding with a hard resin and a soft resin ensures the strength by the hard resin and the flexibility in the bending parts by the soft resin. Moreover, by covering a part of the hard resin part with a layer made of the soft resin, the slipping prevention and the improvement of the design can be brought into effect for the exterior case. Furthermore, a key top for an operational button in the electronic appliance can also be integrally molded.

A projection made of the soft resin that is partially formed on the bottom face part of the exterior case, or a layer made of the soft resin that is formed all over the bottom face part produces an advantage that the effect of vibration to the electronic appliance can be absorbed and the slipping of the electronic appliance can be prevented when the electronic appliance is laid on a table or the like.

Furthermore, simultaneous integral molding, in the exterior case, of a receding part for housing a recording medium and/or a receding part for housing a battery, both used in the electronic appliance, makes it possible to bring into effect the reduction of the number of parts.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An exterior case of an electronic appliance, the exterior case comprising:

a first case part and a second case part as two divisions of the exterior case, the first case part and the second case part being formed of a first resin; and a connecting part which connects the first case part and the second case part, at least a part of the connecting part being formed of a second resin softer than the first resin, wherein:

the first case part, the second case part and the connecting part are integrally molded by one of a two-color molding and an insert molding with the first resin and the second resin; and the first case part and the second case part are assembled into a case-like shape by bending the part formed of the second resin in the connecting part.

2. The exterior case as defined in claim 1, wherein the part formed of the second resin in the connecting part has a thin part to be bent.

3. The exterior case as defined in claim 1, further comprising an outside layer which partially covers a part formed of the first resin in the exterior case for a purpose of at least one of slipping prevention, design and shock absorption for the exterior case, wherein the outside layer is formed of the second resin and molded integrally with the part formed of the first resin in the exterior case.

4. The exterior case as defined in claim 3, wherein the outside layer covers parts to be corners of the case-like shape so as to protect whole of the electronic appliance.

5. The exterior case as defined in claim 3, wherein the outside layer covers all parts to be faces of the case-like shape so as to protect whole of the electronic appliance.

6. The exterior case as defined in claim 3, wherein the outside layer is formed as a projection on a part to be a bottom face of the case-like shape.

7. The exterior case as defined in claim 3, wherein the outside layer covers whole of a part to be a bottom face of the case-like shape.

8. The exterior case as defined in claim 1, wherein:

an opening is formed in a part made of the first resin in the exterior case at a position corresponding to an operation button of the electronic appliance; and the opening is closed with the second resin to be a part of the operational button.

9. The exterior case as defined in claim 1, wherein:

the electronic appliance is a digital camera having an optical member; and an opening is formed in a part made of the first resin in the exterior case at a position corresponding to the optical member of the digital camera, a border of the opening being covered with the second resin.

10. The exterior case as defined in claim 1, wherein:

a battery is detachably attached to the electronic appliance; and a receding part for housing the battery is integrally molded in at least one of the first case part and the second case part.

11. The exterior case as defined in claim 1, wherein:

a recording medium is detachably attached to the electronic appliance; and at least one of a receding part for housing the recording medium and an opening through which the recording medium is inserted and pulled out is integrally molded in at least one of the first case part and the second case part.

12. The exterior case as defined in claim 1, wherein the first resin is one of ABS resin and polycarbonate resin.

13. The exterior case as defined in claim 1, wherein the second resin is an elastomer resin.

* * * * *